3,429,660
ALUMINA PRODUCTION
Carl D. Keith, Summit, N.J., and Kurt W. Cornely, Syosset, N.Y., assignors to Engelhard Industries, Inc.
No Drawing. Filed Dec. 8, 1964, Ser. No. 416,891
U.S. Cl. 23—143    8 Claims
Int. Cl. C01f 7/42

ABSTRACT OF THE DISCLOSURE

An aqueous hydrous alumina slurry containing boehmite and amorphous hydrous alumina is made by hydrolyzing aluminum having a surface area of about 75,000 to 1,000,000 square millimeters per gram, in the presence of a water-soluble carboxylic acid, for instance, formic acid, at a temperature of about 60 to 250° C. The mole ratio of the reactants can be about 1 mole of acid per 2 to 30 gram-atoms of aluminum and at least about 18 moles of water. Incremental addition of the aluminum and acid is especially advantageous.

---

This invention relates to the preparation of alumina and more specifically to a method for the preparation of alumina by the interaction of water and aluminum metal in the presence of an acid. In this invention aluminum, in a state of extremely fine subdivision and high surface area, is contacted with water, preferably at a temperature near the boiling point of water, in the presence of a non-oxidizing acid. The reaction produces a fine particle hydrous alumina slurry in water, the hydrous alumina being either one or both of the valuble boehmite and amorphous forms, suitable for use as precursors for highly preferred catalysts and catalyst bases.

The art suggested reacting aluminum metal with water under a wide variety of conditions to form alumina. In one group of these processes, very high temperature and pressure conditions, as well as conditions of extreme agitation are employed to produce the alumina and often the reaction does not go to completion, that is, a significant amount of free aluminum is left at the end of the reaction. In another group of processes, more moderate temperatures and pressures are employed but these processes usually require the presence of mercury or other heavy metal promoters to achieve commercially useful results. See, for example, U.S. Patent 3,003,952. In either of these types of processes, it has been proposed that aluminum powder may be employed. It has now been found that aluminum in a very fine state of subdivision and with a very high surface area may be reacted with liquid phase water to form alumina, and mercury or other "promoting" metals should be avoided as they actually retard the reaction. It has also been found that the reaction should preferably take place at temperatures near the boiling point of water and even more advantageously at about atmospheric pressure.

This invention is advantageous in its speed and in the fact that the completeness of the reaction (usually essentially 100%) and its freedom from reliance on non-vaporizable reagents gives a purer product for uses such as in catalysts where purity is often essential. This invention can provide the alumina as a much more concentrated water slurry than other processes; often the slurry contains about 3–15% alumina, say about 5–12%, but by the proper choice of reaction procedures, can give a slurry containing as high as about 11 to 12% or more alumina. Under a preferred set of conditions the alumina obtained from the slurry will consist essentially of hydrous alumina in the amorphous and boehmite forms and in the proportions of about one part amorphous to 2–4 parts boehmite, which is advantageous in many catalyst situations. The boehmite is generally of the small crystallite type, say of about 15–35 A.

In this invention the aluminum employed is finer than most materials referred to as "powder" and the metal used has a surface area of about 75 thousand to 1 million square millimeters per gram, preferably about 150,000 to 600,000 mm.$^2$/gm. The aluminum may often be in the general particle size range of about 2 to 100 microns. Preferably at least about 50% of the particles are of about 10 to 40 microns. The aluminum is usually one where at least about 90% can pass a 325 mesh sieve (U.S. Standard Sieve Series).

An aluminum suitable for the process of this invention is commercially available for use, for example, in adhesives. Usually it has a purity greater than about 99% or even greater than 99.9% and may be obtained by atomizinz molten aluminum in air. It often will have a particle size range primarily in the 5 to 50 micron range, for instance as follows:

Particle size (microns): Proportion of particles (percent)
    3.5 to 10 _____ 5–7
    10 to 20 _____ 15–26
    20–30 _____ 16–29
    30–40 _____ 26–31
    40–44 _____ 3–25
    44–70 _____ 4–13

If the aluminum contains more than about 15% of particles in the range of 44–70μ, or an appreciable amount of particles above 70μ, the reaction may require a longer time to go to completion or may never go to completion, under the preferred conditions of acid concentration. Too fine a particle size may lead to temperature control problems in the conversion procedure.

In the process of this invention, an acid is supplied to the reaction between aluminum and water but the amount of acid is insufficient to supply one acid ion for each two atoms of aluminum, that is to say, the ratio of aluminum atoms to acid anions is greater than 2/1 and may be up to about 30/1 or more. Preferably, the ratio of aluminum atoms to acid anions is about 5–15 or even about 25/1. Usually the reaction will be conducted at a pH below about 4.1.

In order to avoid the presence of ions which would require extensinve washing of the product to yield an acceptable catalyst material, the acid employed may be one which will vaporize or be oxidized during the drying or other processing step of the alumina manufacture or decompose to materials vaporizable under these conditions. Nitric or other oxidizing acids give a number of poor results as shown below, in part due to interaction with the hydrogen produced in the reaction, as explained below. Therefore, water-soluble, organic carboxylic acids generally are preferred for the reaction, in particular, the soluble saturated lower fatty acids, say of 1–2 carbon atoms, e.g., formic acid, acetic acid, trichloroacetic acid, etc. The monobasic acids are advantageous and formic acid is the most preferred.

The concentration of acid in the reaction mixture at any point of the reaction may have an effect on the product distribution. The preferred monohydrate hydrous amorphous alumina mixture is produced when the formic acid is very dilute, that is sufficient to keep the pH of the reaction within the range of about 3 to 4. Above this pH, the product may tend to gel before the reaction is complete, thus delaying or preventing completion. Also, the formic acid may tend to decompose excessively. It is often preferably, therefore, to use formic acid of a molarity of about 0.6–0.7 and also to add the formic acid incrementally during the course of the reaction so that the pH will stay within the desired range.

Water in the liquid phase is present in the reaction mixture in amounts sufficient to keep the mixture fluid. Generally, the ratio of water to aluminum will be at least about 9 moles of water per gram atoms of aluminum, preferably about 20–30/1. Higher amounts of water, that is, greater than about 30 moles per gram-atom of aluminum, say up to about 60 or 75 moles, do not seem to offer any advantages to offset the need for a larger reactor volume and a need to filter the resulting alumina product to get a practical slurry concentration. Where aluminum is added incrementally to the reaction mixture, it is possible and sometimes feasible to use slightly less than 10 moles of water per gram atom of aluminum.

The total reaction mixture thus usually contains a ratio of about one mole acid to about 2–30 gram-atoms of aluminum metal to at least about 18, e.g. about 18 to 2,250 moles, of water. Preferably about 100–750 moles of water and 5–15 gram atoms of aluminum are often used per mole of acid.

As mentioned, it may often be preferred to add the aluminum metal and/or the formic acid incrementally to the water during the course of the reaction. Such incremental additions of formic acid and aluminum metal should preferably be at such rates that the approximate 1/5–15/100–750 acid-aluminum-water ratio described above and the 3 to 4 pH are maintained essentially throughout the reaction. Such manipulations accelerate the rate of reaction and provide for improved concentration of $Al_2O_3$ in the product slurry. For ease of handling, the fine aluminum powder may often be transported to the reaction zone as a slurry in water.

Reaction conditions generally include a temperature of at least about 60° C., although the reaction may be slow below the preferred range of about 90–110° C. The reaction can readily take place at a higher temperature, e.g. up to about 500 pounds steam pressure, that is, about 250° C., but pressurized equipment is required at this temperature to keep the necessary liquid phase. At the preferred temperature or below, one atmosphere pressure is satisfactory and water may be refluxed during the reaction. Often the reaction produces a relatively highly concentrated alumina slurry which can be sent immediately to further processing, e.g. drying, addition of catalytic promoting metals, etc. Sometimes, however, it may be desirable to further concentrate the slurry and in such cases additional acid may be used after the reaction to peptize the alumina particles. Subsequent evaporation can then be employed to obtain a pourable thick slurry containing up to about 60% or more hydrous alumina.

The following examples are cited to illustrate further the fine aluminum powder may often be transported to benefits afforded through the utilization thereof.

Example I

To a 1-liter, fluted, three-necked Pyrex flask fitted with a high-speed two-bladed agitator, a reflux condenser and a thermoregulator was added 500 cc. of deionized water, 1 cc. of 88% formic acid and 6.25 grams of atomized aluminum metal (99.5% purity, surface area of 310,000 mm.$^2$/g.; particle size distribution of 5–50µ). The agitator was set to rotate at 1800 r.p.m. and the reaction was initiated at room temperature. As the temperature rose, the rate of hydrogen production increased. The temperature was allowed to reach 100° C. and maintained at this temperature. At the end of 1.5 hours an additional 6.25 grams of aluminum metal and 10 cc. of 0.684 Molar formic acid were added to the reaction mixture. Further equal additions of aluminum metal were made at 3.5, 4.5, 5 and 6 hours total reaction time, so that a total of 25 grams of aluminum metal had been added. During the time interval of 2–6 hours, 0.684 Molar formic acid solution was added until a total of 0.095 moles of 100% formic acid had been added. The reaction was allowed to continue for a total of 12 hours at the end of which the reaction mixture was completely free of aluminum.

The pH of the reaction mixture was shown to be 3.4. The pH was adjusted to 8.4 with a 1:10 dilution of ammonium hydroxide in water. The mixture gelatinized as the pH was increased. The gelled product was filtered and dried at 110° C.

X-ray diffraction analysis showed the dried product to consist of 22% amorphous hydrous alumina and 78% boehmite with a crystallite size of 27.8 Angstroms. The dried product had a surface area of 255 m.$^2$/g. (BET).

Example II

In this example the method of operation was identical to that cited in Example I, with the exception that less formic acid was added. The total moles formic acid added was 0.071 mole. In this case the total reaction time required for the reaction to go to completion was 18 hours. Thus a lower acid concentration increases the itme required for the reaction to go to completion using the same aluminum metal and temperature.

Analysis of the product showed a composition of 24% amorphous alumina and 76% boehmite with a crystallite size of 28.5 Angstroms.

Example III

In order to further study the effect of the acid concentration on the time required to complete the reaction, a run was carried out similar to that cited in Examples I and II but with the exception that the total formic acid to be added was 0.067 mole. At the end of 24 hours, the reaction mixture still contained traces of unreacted aluminum. The indicated degree of completeness as calculated from the hydrogen production was 98.5%. The reaction product was isolated by decantation from the unreacted aluminum, dried and analyzed. The product composition was found to be 23% amorphous alumina, 77% boehmite, with a crystallite size of 33.5 Angstroms and a surface area of 248 m.$^2$/g. (BET).

Example IV

The procedure in this example was identical with that cited in Example I with the exception that instead of formic acid, 0.1 Normal nitric acid was used.

Initially the reactor was charged with 10 grams of aluminum metal (5–50µ particle size distribution, BET surface area of 210,000 mm.$^2$/g.); 1.56 cc. (0.058 mole) of concentrated nitric acid and 400 cc. of de-ionized water. The reaction was run at 100° C. and atmospheric pressure. At 30% conversion a marked increase in viscosity occurred and additional quantities of 0.1 N nitric acid were added to give a total of 30 cc.

At the end of two hours total reaction time, there was a 34% conversion and an additional quantity of aluminum metal was added (5 grams, 0.185 mole). The ratio of materials, therefore, was 0.088 mole nitric acid/0.555 gram atoms aluminum to 27.8 moles water. At the end of 6 hours the reaction was terminated, when extremely slow hydrogen production became apparent, showing that the reaction was approaching inhibition and that it would probably never go to completion. The reaction product was isolated from the unreacted aluminum metal. The total conversion at this time was 58.6%. The isolated product was dryed and analysed. Analysis showed the composition: amorphous alumina 13%; boehmite 84%, crystallite size 88.9 A. and a total of 3% trihydrates. pH of the reaction mixture at termination was 7.6.

Example V

To show the effect of high formic acid concentrations, a reactor flask, as described in Example I, was provided with 50 grams (1.85 moles) of atomized aluminum metal (5–50µ particle size distribution, 99.5% purity, surface area of 230,000 mm.$^2$/g., 250 ml. of 88% formic acid and 250 ml. of de-ionized water, a gram mole or atom ratio of acid to aluminum to water of 1/0.322/2.77. The reaction flask was heated externally to 100° C. and held at this temperature. The reaction mixture was agitated by means of a two-bladed propeller type agitator. The reaction was allowed to go to 60% completion at which time it was terminated when it became apparent that the reaction rate was rapidly decreasing. The reaction product was isolated from the large amount of unreacted aluminum metal, dried and analyzed. Analysis showed the reaction product to be a mixture of boehmite and gibbsite in about equal amounts with a relatively large crystallite size. Thus, high concentrations of formic acid fail to yield a product consisting essentially of alumina monohydrate and hydrous amorphous phases and also gave boehmite of a large crystallite size, rather than the smaller size crystallite material obtained with lower acid concentrations. This smaller crystallite size material is often advantageous in catalyst uses where a greater surface area must be presented.

Example VI

To a 50 gallon, propeller agitated, steam-jacketed reactor fitted with a reflux condenser was added 35 gallons of deionized water, 200 cc. of 88% formic acid and 3.5 lbs. of atomized aluminum (99.5% purity, 5–50μ particle size distribution, BET surface area 310,000 mm.²/g.). The reaction mixture was, under agitation, heated to 100° C. and maintained at reflux. At the end of 1.5 hours an additional amount of atomized aluminum metal (3.5 lbs. in 3 gal. water) was pumped into the reactor. Also at this time the continuous addition of the 88% formic acid was begun by means of a bellows pump set at a rate to deliver 100 cc./hour. This acid addition was continued until a total of 1380 cc. of 88% acid had been added.

At 3.5, 4.5, 5 and 6 hours, additions of aluminum-in-water slurry were made. Each addition was 1.75 lbs. aluminum metal to 1.75 gallons water. The total addition metal was 14 lbs. in 45 gallons water. The reaction was allowed to continue for 14 hours at the end of which time there was no unreacted aluminum metal.

Analysis of the reaction product showed:

Amorphous alumina: 27%
Boehmite: 73%, crystallite size 30.0 Angstroms:
pH: 3.7 Concentration, percent $Al_2O_3$: 6.35 (Theory 6.58%)

Example VII

In this run atomized aluminum metal containing 0.014% iron, 97.2% of which passed through a 325 mesh screen was employed along with 88% formic acid and deionized water. Each reagent was incrementally added as shown below. The completion figures are based on the hydrogen produced as measured by a wet test meter and may include a small amount of gases produced from the decomposition of formic acid.

tion mixture was added a solution of mercuric chloride, equivalent to 0.1 gram (0.037 mole) $HgCl_2$ to 0.37 mole of aluminum metal.

During the first thirty minutes of reaction, the hydrogen production rate was identical with those runs performed without mercuric chloride. However, after the first thirty minutes the reaction rate rapidly decreased and at the end of one hour the reaction was substantially inhibited and no longer evolved significant hydrogen.

Example IX

This was a repeat of Example VIII with the exception that the amount of mercuric chloride added was such that there was 0.0100 mole $HgCl_2$ to 0.37 mole of aluminum metal.

During the first 45 minutes of reaction, the hydrogen production rate was slightly higher than that noted in Example VIII, but at the end of 1.5 hours the reaction was fairly completely inhibited and no longer evolved much hydrogen.

A comparison of the conversion obtained in Examples VIII and IX with that obtained before the first incremental alumina addition of Example VII is as follows:

| Example | Conversion (percent) | | |
|---|---|---|---|
| | VIII | IX | VII |
| Time: | | | |
| 1 hr | 12.5 | 13.2 | 17–22 |
| 2 hrs | 14.2 | 14.4 | 33–38 |
| 3 hrs | 17.1 | 15.7 | |

Example X

The procedure of Example I is followed but using, 0.37 gram atoms of aluminum, 22.2 gram moles of water and 0.53 mole acetic acid, a ratio of 1/7.0/420 of the ingredients. Results substantially equal to those of run 1 are obtained.

Example XI

Two runs were performed similar to Example I but without the use of any acid. These runs required the external application of heat; one being held at 65° C., the other at 75° C. The dionized water had a pH of about 5.3 and after the aluminum powder was added and stirring begin, the pH rose to that shown below as "initial pH." The results were as follows:

| Total reaction time (hours) | Reagents | | | | | | Reaction Completion | |
|---|---|---|---|---|---|---|---|---|
| | Aluminum | | Water | | Formic acid (88%) | | Before each addition | After each addition |
| | Weight (pounds) | Total (percent) | Volume (gallons) | Total (percent) | Volume (cc.) | Total (percent) | | |
| 0 | 4 | 17.4 | 30 | 71 | 400 | 14.5 | 0 | |
| 1 | | | | | | | 21.4 | |
| 2 | 5 | 39.2 | 1.5 | 75.5 | 250 | 23.6 | 37.5 | 16.6 |
| 3 | | | 0.5 | 76.2 | 310 | 34.8 | 36.6 | |
| 4 | | | | | 270 | 44.5 | 61.2 | |
| 5 | 4 | 56.5 | 2.0 | 81.0 | 275 | 54.7 | 85.3 | 59.3 |
| 6 | | | | | 245 | 63.5 | 82.0 | |
| 7 | 3 | 69.5 | 2.0 | 85.7 | 210 | 71.0 | 89.0 | 64.4 |
| 8 | | | | | 240 | 80.0 | 91.0 | |
| 9 | 6.5 | 100 | 7.0 | 100 | 180 | 86.2 | 96.1 | 68.5 |
| 11 | | | | | 380 | 100.0 | 93.7 | |
| 17 | | | | | | | 105.2 | |

The product from this run was a milk-white fluid, which is thixotropic and has a total concentration of $Al_2O_3$ of 10.84% (Theory 10.98%). X-ray diffraction patterns show that this material, after gelation and drying, is 34% amorphous hydrous alumina and 66% boehmite having a crystallite size of about 18 A.

Example VIII

The procedure in this experiment was identical to that of Example I with the exception that to the initial reac-

| Initial pH | Temp. of reaction (° C.) | Final pH | Percent conversion | Hours to reaction end |
|---|---|---|---|---|
| 6.3 | 65 | 9.8 | 96.2 | 23 |
| 6.4 | 75 | 9.9 | 95.8 | |

The "final pH" indicates a considerable solubility of the freshly precipitated aluminum hydroxide of 9.9–9.9, which represents a greater hydroxyl ion concentration than 0.1 N NaHCO₃, which has a pH of about 8.4. The products in each of these runs had only a minor portion of desired amorphous and boehmite phases.

the above. In the "Percent Completion" column, the first figure represents the conversion prior to addition of aluminum; the second figure is the degree of conversion based upon the total aluminum added.

| Total reaction time (hrs.) | Aluminum added | | Water Added | | Formic acid | | Percent completion of reaction |
|---|---|---|---|---|---|---|---|
| | Wt. | Percent total | Vol. (gal.) | Percent total | Vol. (cc.) | Percent total | |
| 0 | 4 | 17.4 | 30 | 71 | 400 | 14.0 | 0 |
| 2 | 5 | 39.2 | 1.5 | 75 | 700 | 24.6 | 35.2(15.65) |
| 5 | 5 | 60.8 | 2.0 | 79.5 | 1,450 | 51.0 | 57.3(36.7) |
| 7 | 3 | 74 | 1.5 | 83.5 | 1,850 | 64.8 | 69.7(57.5) |
| 9 | 6 | 100 | 7 | 100 | 2,300 | 80.8 | 89.7(66.6) |
| 10¾ | 0 | | | | 2,850 | 100 | 92.8 |
| 18½ | 0 | | | | | | 104.5 |
| Total | 23 | 100 | 42 | 100 | 2,850 | 100 | |

Example XII

To a three-necked Pyrex flask, fitted with a reflux condenser, an agitator regulated to give 1050 r.p.m. a thermoregulator set to maintain temperature of reaction at 100° C., was added 400 cc. deionized water (22.2 gm.-moles) and 10 grams (0.37 gm.-mole) of flaked aluminum metal (99.0% purity, flake size 250–420μ, approximate thickness 0.0001", having a surface area of 600,000 mm.²/gm. The aluminum metal had a surface coating of stearic acid which was used as a milling lubricant. To this mixture was added (0.00082 gm.-mole) formic acid (as 88% acid). This amounted to 5% of the total formic acid to be added. The thermoregulator was set to 100° C., and the reaction mixture was maintained at this temperature during the course of the reaction. At intervals of 45 minutes, and over a period of 6 hours, additional quantities of 88% formic acid were added, so that the total formic added was 0.0163 gram-mole. The ratio of materials used in the reaction was 1 mole formic acid to 22.7 gram-atoms aluminum to 1360 moles of water; 60 moles of water were used per gram atom of aluminum. The reaction was continued for a period of 24 hours, at the end of which time there was no unreacted aluminum metal remaining. The product was isolated, by adjusting initial pH (3.6) to 10.4 by means of a 1:10 dilution of concentrated ammonium hydroxide. The resulting slurry contained 4.52% Al₂O₃. Filtering the precipitated alumina, washing and drying at 100° C. for 6 hours gave an alumina containing about 0.3% iron, 0.02% zinc and 0.05% silicon which showed, by X-ray diffraction, a composition of 29% amorphous alumina and 71% boehmite of 29 A. crystallite size.

Example XIII

To a 50 gallon capacity, stainless steel, baffled reaction kettle, fitted with a reflux condenser, an agitator fitted with a double four-bladed turbine rotating at such a speed as to give a linear tip speed on the turbine of 900 ft./min. instrumented to allow for temperature control, hydrogen evolution measurement and facilities for addition of reagents, was added a quantity of high purity atomized aluminum metal (99.99% purity, 0.0018% Fe, 5–50μ particle size distribution, surface area of 320,000 mm.²/g.), approximately 70% of the total water to be utilized and 14% of the total formic acid to be used. The reaction was initiated at ambient temperature, raised to 100° C., and maintained at this temperature during the course of the reaction. During a period of 9 hours, aluminum metal was added in a slurry form with water; and the addition of 88% formic acid continued until the calculated amount of formic acid had been added.

Tabulated below are the experimental data relative to

The 104.5% conversion is based on the degree of conversion calculated from a wet-test meter. The product was 10.92% Al₂O₃ and showed an X-ray diffraction of: amorphous, 29%; boehmite, 71% (21 A.).

It can thus be seen that the process of this invention enables production af alumina from aluminum powder under controlled conditions to give a highly useful alumina product mixture.

It is claimed:

1. A process for the manufacture of an aqueous hydrous alumina slurry, the alumina of which contains both boehmite and amorphous hydrous alumina as determined by X-ray diffraction analysis of the dried solids of said slurry consisting essentially of reacting finely divided aluminum having a surface area of about 75,000 to 1 million square millimeters per gram with liquid water in the presence of a water-soluble, lower fatty acid while maintaining the ratio of about 1 mole of acid/2–30 gram-atoms of aluminum/at least about 18 moles of water, at a temperature of about 60–250° C. and a pressure sufficient to maintain the liquid phase.

2. The process of claim 1 in which the aluminum powder is in a size range of about 5 to 50 microns.

3. The process of claim 1 in which the reaction takes place at a temperature of about 90–110° C. and about one atmosphere pressure.

4. The process of claim 1 in which the acid is formic acid.

5. The process of claim 4 in which the ratio of reactants is about one mole formic acid/5–15 gram-atoms of aluminum/100–750 moles water.

6. The process of claim 5 in which th aluminum powder is in a size range of about 5 to 50 microns and the reaction takes place at a temperature of about 90–110° C. and about one atmosphere pressure.

7. A process for the manufacture of an aqueous hydrous alumina slurry, the alumina of which contains both boehmite and amorphous hydrous alumina as determined by X-ray diffraction analysis of the dried solids of said slurry which consists essentially of reacting at a temperature of about 90 to 110° C. a mixture consisting essentially of water, aluminum having a surface area of about 150,000 to 600,000 square millimeters per gram and formic acid sufficient to impart a pH of about 3 to 4, holding the reaction mixture at a temperature of about the boiling point of water, incrementally adding aluminum powder and formic acid to maintain said pH and temperature and continuing said holding until a mixture of hydrous alumina and water is obtained having a concentration of about 5–12% alumina.

8. The process of claim 7 in which substantially no free aluminum remains when said concentration is reached.

(References on following page)

References Cited
UNITED STATES PATENTS
| | | | |
|---|---|---|---|
| 2,258,099 | 10/1941 | Patrick | 23—143 |
| 2,336,597 | 12/1943 | Connolly | 23—143 X |
| 2,758,011 | 8/1956 | Bloch | 23—143 |
| 2,915,475 | 12/1959 | Bugosh | 23—143 X |
| 2,950,169 | 8/1960 | Murray et al. | 23—143 |
| 3,222,130 | 12/1965 | Hauschild | 23—143 |

OTHER REFERENCES

Calvert et al.: Societe Chimique de France, Bulletin T. 20, pp. 101 and 102 (1953).

Newsome et al.: "Alumina Properties," Aluminum Company of America, Pittsburgh, Pa., 1960, pp. 69 and 70.

OSCAR R. VERTIZ, *Primary Examiner.*

G. T. OZAKI, *Assistant Examiner.*

U.S. Cl. X.R.

252—463